May 22, 1934.  R. C. LIVESAY  1,959,432
WINDROWER
Filed June 26, 1933

INVENTOR
Robert C. Livesay
BY
ATTORNEY.

Patented May 22, 1934

1,959,432

UNITED STATES PATENT OFFICE 1,959,432

WINDROWER

Robert C. Livesay, Moline, Ill., assignor to Deere & Company, Moline, Ill., a corporation of Illinois Application June 26, 1933, Serial No. 677,541

6 Claims. (Cl. 56—23)

This invention relates to windrowers in general and more particularly to windrowers of the type comprising a platform having a discharge opening therein and having a cutting mechanism disposed along the front of the platform and in advance of the opening, and a conveyor for receiving the cut grain and discharging it into the opening to lay it in the form of a windrow on standing stubble.

The main object of this invention is to provide a device to be associated with this type of windrower which will expedite the operation of opening up a field. In opening up a field it is usual to first cut the back swath which is that swath along the outer edge of the field and usually adjacent a fence. In cutting this back swath with a windrower in which the delivery opening is on the left hand side of the platform, the windrower is driven in a counter-clockwise direction, to form a windrow spaced as far as possible away from the fence. After this back swath windrow has been laid, the windrower is driven in a clockwise direction around the field so as to cause the windrower to deposit the grain of the second swath in windrow formation on top of the back swath windrow. In order to prevent that portion of the cutting mechanism disposed in front of the discharge opening in the platform from running through the back swath windrow and scattering it, it has been proposed to provide a windrow compressor on the platform in front of the discharge opening which will compress the back swath windrow down below the level of the cutting mechanism to enable the cutting mechanism of the windrower to pass over it. In laying a windrow, however, it is highly desirable that it be laid on top of the standing stubble and be maintained in as loose condition as possible so that air can circulate freely through and beneath it. With the windrow held some distance above the ground by stubble standing erect, the operation of picking up the windrow by the pick-up attachment on the combination harvester-thresher is facilitated. The use of the compressor has the decided disadvantage that it forces the back swath windrow down into the standing stubble and close to the ground and also compresses it, resulting in a windrow which is difficult to pick up and also one through which air cannot circulate freely. According to my invention, instead of compressing the back swath windrow I provide a windrow lifter for elevating the back swath windrow over the cutting mechanism and depositing it through the discharge opening together with the cut grain of the second swath. As a result of this method, the double windrow so formed is maintained in a fluffy state and laid on top of the standing stubble above the ground as is desired for proper aeration and for facilitating the operation of picking up the windrow by the pick-up mechanism of the harvester-thresher.

To facilitate lifting and guiding the back swath windrow into the discharge opening in the platform, especially in heavy grain, I prefer to cut the back swath at an elevation somewhat higher than the height at which the second swath is cut. This positions the back swath windrow held by the stubble upon which it is laid at an elevation higher than the height at which the platform is positioned in cutting the second swath. In this case the windrow lifter guides the back swath windrow over the cutting mechanism and into the discharge opening without having to lift it appreciably.

The objects of my invention, therefore, are: to introduce a new method of opening up a field with a windrower having a discharge opening in the platform thereof, which consists in cutting a back swath around the field in one direction and then cutting a second swath around the field in the opposite direction, and at the same time, picking up the back swath windrow above the cutting mechanism and depositing it into the discharge opening in the platform of the windrower together with the cut grain of the second swath being deposited therein; to introduce the method of opening up a field with a windrower having a discharge opening in the platform thereof, which consists in cutting a back swath around the field in one direction at one elevation and then cutting a second swath around the field in the opposite direction at an elevation somewhat lower than the elevation at which the back swath was cut, and at the same time, guiding the back swath windrow over the cutting mechanism and depositing it into the discharge opening in the platform of the windrower together with the cut grain of the second swath being deposited therein; and to provide a windrower having a discharge opening in the platform thereof with the cutting mechanism of the windrower disposed in advance of the opening and having a windrow lifter on the platform in advance of the cutting mechanism and in line with the discharge opening in the platform.

A preferred embodiment of my invention is described in the following specification in connection with the accompanying drawing wherein.

Figure 1:
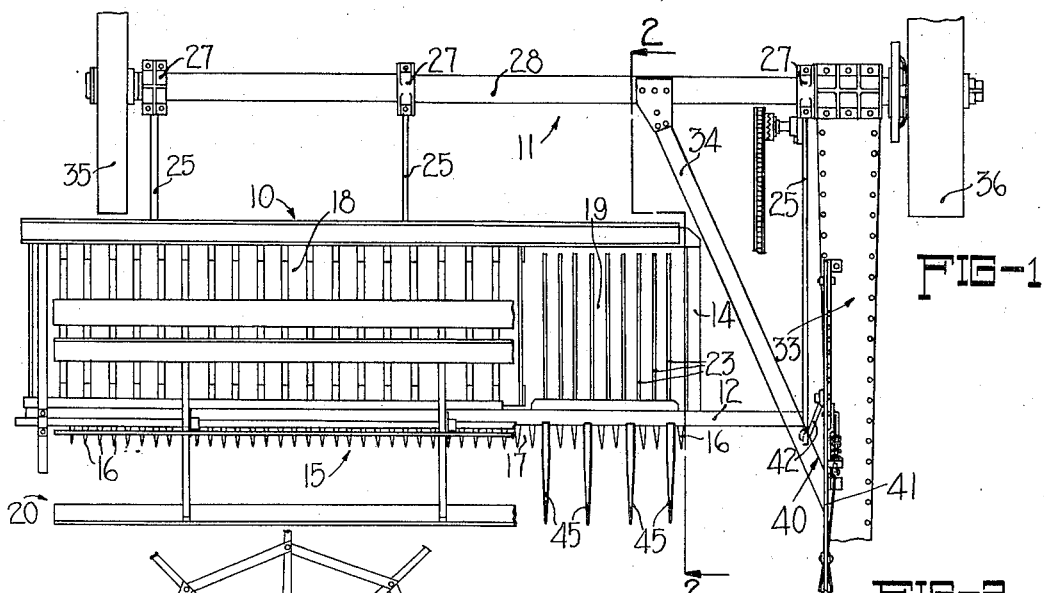
Figure 1 is a top view of a windrower equipped with my windrow lifting device. Inasmuch as my invention is not concerned with the construction or operation of the windrowing mechanism per se, only such parts of the windrower are shown as are thought necessary to illustrate the construction and operation of my invention.

The windrower illustrated comprises a platform 10 carried by a wheel supported frame 11. Platform 10 comprises a pair of transversely extending longitudinally spaced frame members 12 and 13 connected by means of a plurality of longitudinally extending members 14. A cutting mechanism 15 is disposed along the forward edge of the platform and comprises a series of guard fingers 16 fixed to the frame member 12 upon which a reciprocating sickle 17 is slidingly supported. Between frame members 12 and 13 and extending from the outer end of the platform 10 to a point adjacent the inner end thereof is a belt conveyor 18. The space between the inner end of the conveyor 18 and the inner end of the platform back of the inner end of the cutting mechanism 15 constitutes a discharge opening 19. Conveyor 18 functions to receive the grain cut by the cutting mechanism 15 and convey it inwardly into the discharge opening 19. The grain cut by that portion of the cutting mechanism in front of the discharge opening 19 falls directly into the discharge opening. A reel 20 of the usual construction is also supported on the platform upon the forward ends of forwardly extending arms 21 supported from the wind board 22 extending from the rear of the platform. Reel 20 functions in the usual manner to direct the grain against the cutting mechanism 15 and move the cut grain upon the conveyor 18. A series of downwardly inclined rods 23 are disposed in the discharge opening 19 being supported at their forward ends from the front frame member 12. These rods function to prevent the grain being deposited in the discharge opening 19 from crushing down and falling through the standing stubble. As a result, the windrow is caused to be laid on top of the standing stubble with the stubble in a more or less erect position.

The platform 10 is supported from the main frame of the windrow 11 by means of a number of forwardly extending arms 25 to the forward ends of which frame members 12 and 13 are connected. The rear ends of arms 25 are pivotally connected at 26 to supporting members 27 carried by the transverse pipe member 28. The windrower is drawn through a draft beam 33 connected at its rear end to the pipe member 28 and braced thereto by means of diagonal brace 34. The front end of draft beam 33 may be either supported directly on the tractor by which the windrower is drawn or it may be supported on a steering truck having a tongue connected to the tractor. The rear end of the main frame 11 is supported on a pair of wheels 35 and 36 journaled on opposite ends of pipe member 28. The platform 10 may be adjusted vertically to cut grain at different levels, depending on the height of grain, by means of an adjusting mechanism 40. This mechanism includes lever 41 pivotally mounted on the draft beam 33 and link-connected to the forward end of inner arm 25 of the platform 10 by means of link 42. Operating lever 40 will swing the platform 10 about pivots 26 to raise or lower the same.

The mechanisms of the windrower including the cutting mechanism 15, conveyor 18 and reel 20 may be operated from a power take-off connection with the tractor pulling the windrower or from power derived from the supporting wheel 36. Inasmuch as the invention is not concerned with the construction of the windrower itself or the manner in which it is operated, the structure of the windrower and the driving connections to the mechanisms have not been shown. For a detailed description and disclosure of a similar windrower, reference may be had to my copending application Serial No. 592,388, filed February 12, 1932.

My invention consists in providing a windrow lifter on the platform in front of the discharge opening and in advance of the cutting mechanism for lifting a windrow previously laid over the cutting mechanism and depositing it into the discharge opening. While various forms of lifting devices might be employed, I prefer to use a plurality of lifting members 45. These members are supported from the front frame member 12 of the platform by means of forwardly extending supports 46 bolted to the frame member 12, preferably by the same bolts that connect the guard fingers 16 to the frame member 12. I form the supports 46 with a loop 47 near the forward end thereof to embrace the tip of a guard finger 16. Lifting members 45 are pivoted to the front end of supports 46 at 48 in order that they may follow the unevenness of the ground surface when cutting short grain and the cutting mechanism is being operated at a relatively low level. Lifting members 45 are more or less pointed at their front ends and have a rearwardly extending lifting bar 49 extending from the tip of the member 45 upwardly and rearwardly above the guard fingers 16. In operation, the forward ends of the lifting members 45 project into the stubble below the windrow to be lifted. The lifting bars 49 thereof in the forward advance of the machine run along the bottom of the windrow and lift the windrow above the cutting mechanism 15 and then deposit it into the discharge opening 19.

Figures 3, 4:
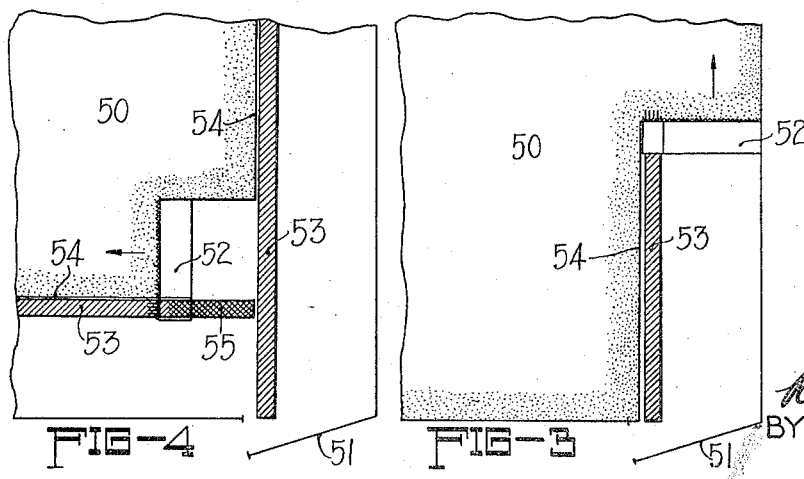

In the use of this windrower, a fenced in field 50 will be entered through gate 51, for example, as shown in Fig. 3, the machine first taking the back swath along the fence by traveling in a counter-clockwise direction indicated by the arrow adjacent the machine diagrammatically shown at 52. During this operation, the back swath windrow 53 is laid adjacent the wall 54 of standing grain. After the machine has been driven all around the field, it is turned around to cause it to travel in a clockwise direction to cut the second swath. In cutting the second swath, the machine 52 is disposed so that the discharge opening thereof will be directly in line with the back swath windrow 53, as shown in Figure 4. The windrow lifting device now functions to lift the windrow 53 over the cutting mechanism 15 and to cause it to be deposited together with the grain of the second swath into the discharge opening 19 to form a double swath as shown at 55. The succeeding rounds are made by driving the machine in the same direction as the second round but in such case, of course, only a single windrow is laid.

Figure 2:
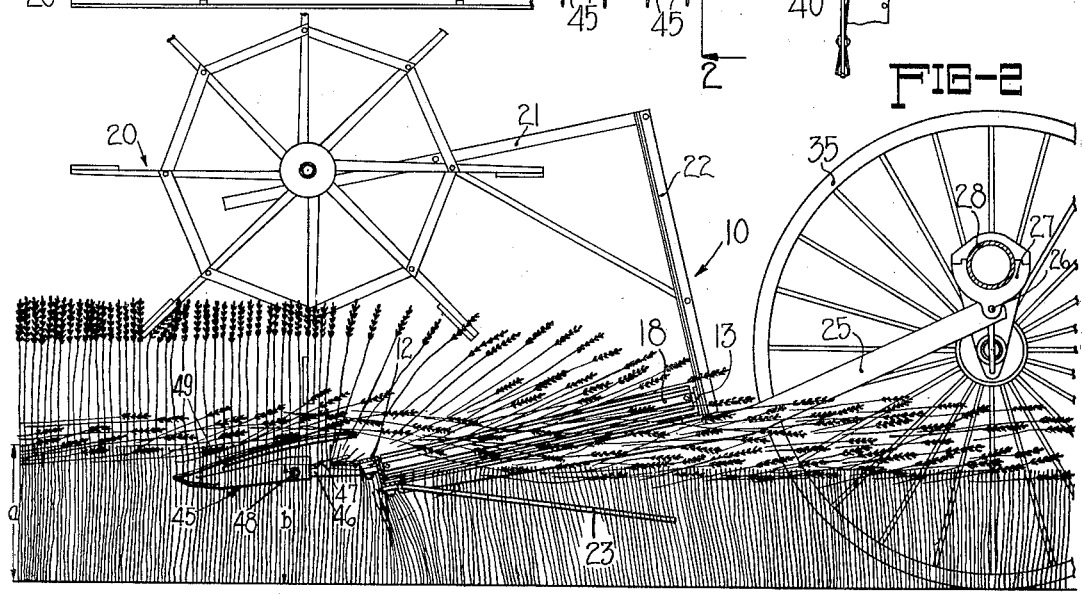
Figure 2 is a cross-sectional view along the line 2—2 of Figure 1 and showing the windrower with the windrow lifting device in operation; and, Figures 3 and 4 are diagrammatic views of the field illustrating the operation and use of my improved windrower in opening up a field.

Preferably the back swath is cut at an elevation a few inches higher than the elevation at which the second swath is cut. The longer stubble of the back swath thereby supports the back swath windrow at an elevation above the height at which the platform is operated in cutting the second swath. As a result, when cutting the second swath, the windrow lifter merely functions to guide the back swath windrow over the cutting mechanism of the platform and into the discharge opening without having to lift it appreciably. In the illustration in Fig. 2 of the operation this latter method is being followed. The back swath has been cut at an elevation $a$ and the second swath is being cut at an elevation $b$. This operation, of course, is optional, and if desired both the back swath and the second swath may be cut at the same elevation. The windrow lifter is adapted to lift the windrow over the cutting mechanism of the harvester even though it lay at the same elevation as the height at which the second swath is being cut.

A particular feature of my invention is that there is no necessity of the operator ever removing the windrow lifting devices 45. They may be left on the machine permanently, if desired. When no windrow it to be lifted by them they merely travel through the standing grain. For this same reason, the operator may place the lifting devices on the windrower before he enters the field, if they are not already in place. In this respect my lifting devices have an additional advantage over the use of the compressor plate, since the compressor plate can only be on the machine when making the second round and must be removed from the machine at all other times. For this reason it is necessary for the operator to carry the compressor plate with him, unattached from the machine, stop operation after cutting the back swath and attach the compressor plate, and again stop operation after cutting the second swath to remove the compressor plate before he can cut the succeeding swath. With the use of my device these two interruptions in the harvesting operation are avoided.

Having described my invention, what I regard as new and wish to secure by Letters Patent is:—

1. In the process of harvesting grain with a windrower of the type having a harvesting platform comprising a laterally extending cutting mechanism, a conveyor in rear of all but a portion of said cutting mechanism, the space in rear of said portion of the cutting mechanism constituting a discharge opening into which grain is delivered by said conveyor, the method of opening up a field which consists in cutting a back swath around the field by operating the windrower in a direction to lay the back swath windrow adjacent the inner edge of the back swath, then cutting a second swath around the field by operating the windrower in the opposite direction with that portion of the cutting mechanism in front of the discharge opening being disposed in line with the back swath windrow previously laid, and picking up the back swath windrow and raising it above said cutting mechanism and depositing it into said discharge opening together with the grain being deposited into said discharge opening by said conveyor to form a double windrow during the operation of cutting the second swath.

2. A windrower comprising a laterally extending cutting mechanism, a conveyor in rear of said cutting mechanism and extending from the outer end of said cutting mechanism to near the inner end of said cutting mechanism, the space beyond the inner end of said conveyor in rear of the inner end of said cutting mechanism forming a discharge opening into which grain is delivered by said conveyor to lay a windrow, and means disposed forwardly of said cutting mechanism in front of said discharge opening for lifting a previously laid windrow over said cutting mechanism and depositing said previously laid windrow into said discharge opening together with the grain being deposited into said discharge opening by said conveyor to form a double windrow.

3. A windrower comprising a laterally extending cutting mechanism, a conveyor in rear of all but a portion of said cutting mechanism, the space in rear of said portion of the cutting mechanism constituting a discharge opening into which grain is delivered by said conveyor to lay a windrow, and means extending forwardly from that portion of the cutting mechanism in front of said discharge opening for lifting a previously laid windrow over said cutting mechanism and depositing said previously laid windrow into said discharge opening together with the grain being deposited into said discharge opening by said conveyor to form a double windrow.

4. In a windrower, a cutting mechanism, means for receiving cut grain and delivering it to a point of discharge rearwardly of the cutting mechanism, and a windrow lifter in advance of said cutting mechanism in line with said point of discharge for lifting a previously laid windrow over the cutting mechanism and depositing it with the grain being delivered by said receiving and delivering means to form a double windrow.

5. In a windrower, a platform having an opening therein, a cutting mechanism disposed in advance of the opening and along the front of the platform, a conveyor receiving the cut grain and discharging it into said opening, and a windrow lifter on the platform in advance of the cutting mechanism and in line with the platform opening.

6. In the process of harvesting grain with a windrower of the type having a harvesting platform comprising a laterally extending cutting mechanism, a conveyor in rear of all but a portion of said cutting mechanism, the space in rear of said portion of the cutting mechanism constituting a discharge opening into which grain is delivered by said conveyor, the method of opening up a field which consists in cutting a back swath around the field at one level by operating the windrower in a direction to lay the back swath windrow adjacent the inner edge of the back swath, then cutting a second swath around the field at a lower level by operating the windrower in the opposite direction with that portion of the cutting mechanism in front of the discharge opening being disposed in line with the back swath windrow previously laid, and guiding the back swath windrow over the cutting mechanism and depositing it into said discharge opening together with the grain being deposited into said discharge opening by said conveyor to form a double windrow during the operation of cutting the second swath.

ROBERT C. LIVESAY.